(12) United States Patent
Vivanco et al.

(10) Patent No.: US 11,653,401 B2
(45) Date of Patent: May 16, 2023

(54) METHODS, SYSTEMS, AND DEVICES FOR ENHANCED CELL ACTIVATION IN A NETWORK SUPPORTING DUAL CONNECTIVITY

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Mikolaj Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

(21) Appl. No.: 17/583,857

(22) Filed: Jan. 25, 2022

(65) Prior Publication Data
US 2022/0151001 A1 May 12, 2022

Related U.S. Application Data

(63) Continuation of application No. 17/095,569, filed on Nov. 11, 2020, now Pat. No. 11,272,560.

(51) Int. Cl.
*H04W 4/00* (2018.01)
*H04W 76/15* (2018.01)
(Continued)

(52) U.S. Cl.
CPC .......... *H04W 76/15* (2018.02); *H04B 17/318* (2015.01); *H04W 24/10* (2013.01);
(Continued)

(58) Field of Classification Search
None
See application file for complete search history.

(56) References Cited

U.S. PATENT DOCUMENTS

2012/0281566 A1 11/2012 Pelletier et al.
2013/0190031 A1 7/2013 Persson et al.
(Continued)

OTHER PUBLICATIONS

"WirelessMoves—5G—Part 3—Dual Connectivity (EN-DC)", https://blog.wirelessmoves.com/2017/09/5g-part-3-dual-connectivity-en-dc.html, Sep. 30, 2017, 3pgs.

*Primary Examiner* — Suhail Khan
(74) *Attorney, Agent, or Firm* — Guntin & Gust, PLC; Kenneth Kwan

(57) ABSTRACT

Aspects of the subject disclosure may include, for example, obtaining data relating to a user equipment communicatively coupled to a first network node, the data including information regarding a data buffer associated with the user equipment, obtaining node information relating to a second network node, the node information identifying available network resources of the second network node and a coverage range of the second network node, determining, based on the information regarding the data buffer, that a status of the data buffer satisfies a condition, determining that the first network node has insufficient network resources to satisfy a network resource demand of the user equipment based on the determining that the status of the data buffer satisfies the condition, and selectively activating the second network node, based on the available network resources of the second network node and the coverage range of the second network node. Other embodiments are disclosed.

20 Claims, 8 Drawing Sheets

(51) Int. Cl.
  *H04W 24/10*  (2009.01)
  *H04W 28/02*  (2009.01)
  *H04W 28/20*  (2009.01)
  *H04B 17/318* (2015.01)
  *H04W 84/18*  (2009.01)

(52) U.S. Cl.
  CPC ....... *H04W 28/0268* (2013.01); *H04W 28/20* (2013.01); *H04W 84/18* (2013.01)

(56) References Cited

U.S. PATENT DOCUMENTS

| | | |
|---|---|---|
| 2018/0007698 A1 | 1/2018 | Li et al. |
| 2019/0150103 A1* | 5/2019 | Papasakellariou ............ H04W 72/0446 370/329 |
| 2020/0022043 A1 | 1/2020 | Pelletier et al. |
| 2021/0144582 A1 | 5/2021 | Yi et al. |

* cited by examiner

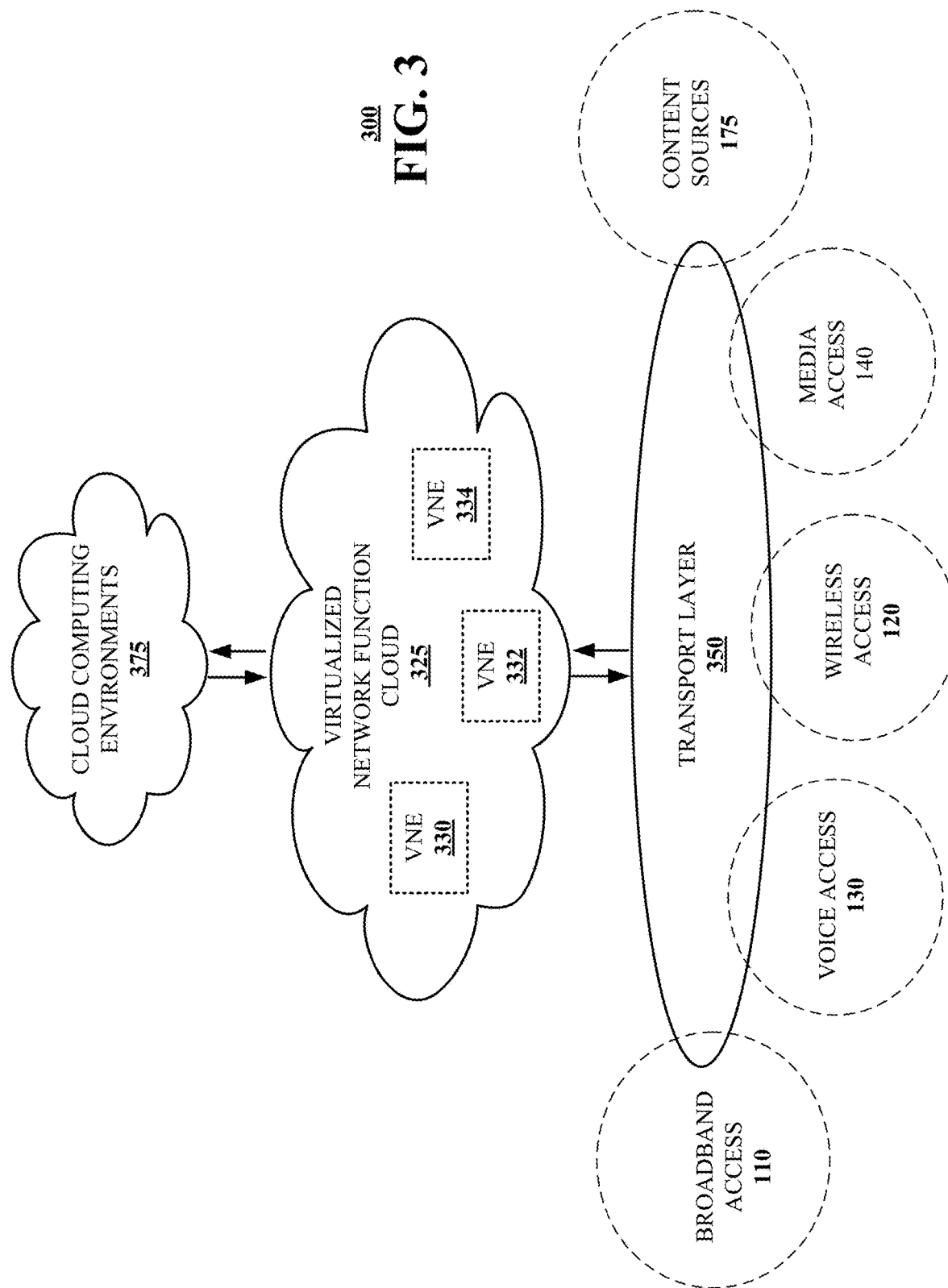

METHODS, SYSTEMS, AND DEVICES FOR ENHANCED CELL ACTIVATION IN A NETWORK SUPPORTING DUAL CONNECTIVITY

CROSS-REFERENCE TO RELATED APPLICATION

The present application claims priority to and is a continuation of U.S. patent application Ser. No. 17/095,569, filed Nov. 11, 2020. All sections of the aforementioned application are incorporated herein by reference in their entirety.

FIELD OF THE DISCLOSURE

The subject disclosure relates to enhanced (e.g., data buffer-based) cell activation in a network supporting dual connectivity.

BACKGROUND

Some cellular-based networks support a dual connectivity mode of operation, such as E-UTRAN New Radio (NR)–Dual Connectivity (EN-DC). In such networks, for example, a user equipment that is equipped with appropriate radio access technologies (RATs) can simultaneously communicate with the network over an E-UTRA band and an NR band. A network operator can activate the dual connectivity mode for a user equipment via blind addition. In blind addition, a master network node (e.g., a Master eNodeB, or MeNB) of one cell predefines a default secondary network node (e.g., a Secondary gNodeB, or SgNB) of a neighboring cell for use with dual connectivity. If the user equipment is within a coverage area of the secondary network node, and the user equipment attempts to attach to the secondary network node, the master network node can permit the attachment. If, however, the user equipment is not within the coverage area of the secondary network node, dual connectivity can remain disabled, and any communication session, such as a call session associated with the user equipment, may continue via the master network node.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1A:
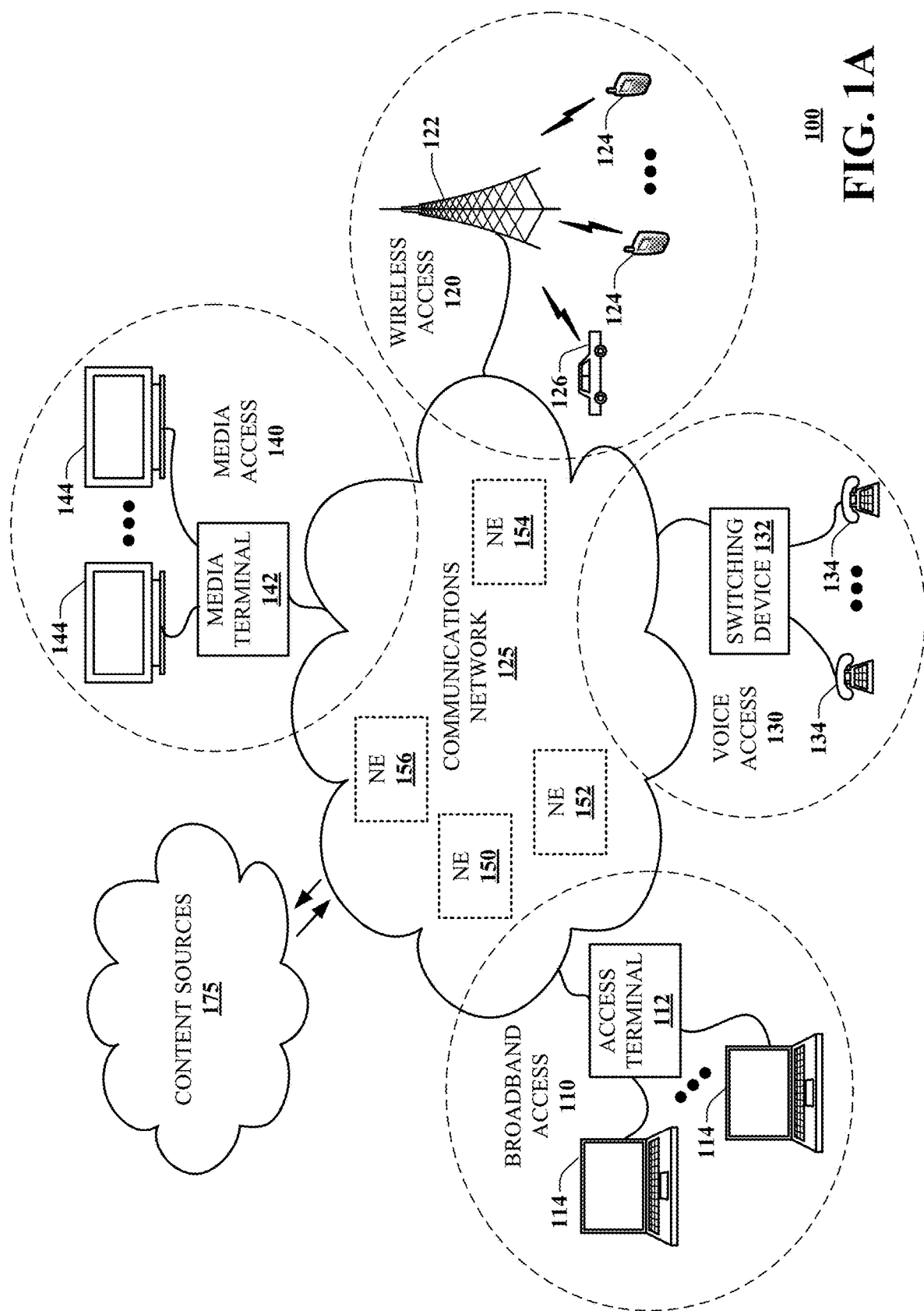
FIG. 1A is a block diagram illustrating an exemplary, non-limiting embodiment of a communications network in accordance with various aspects described herein.

The subject disclosure describes, among other things, illustrative embodiments for a system that is capable of dynamically controlling, for a user equipment, activation and/or deactivation of one or more secondary cells (e.g., secondary network nodes of an NR cell and/or secondary cells (SCells), such as Long Term Evolution (LTE) carrier aggregation (CA) Scells) of a network operable in a dual connectivity mode (e.g., EN-DC), based on a status of a data buffer associated with the user equipment and available network resources (e.g., available bandwidth or the like) of the one or more secondary cells. Additionally, or alternatively, in some embodiments, the system is capable of selectively activating and/or deactivating secondary cell(s) based on coverage range(s) of the secondary cell(s), movement (or projected movement) of the user equipment within a cell or amongst various cells, signal strength measurement(s) associated with the secondary cell(s), and/or Quality of Service (QoS) requirements associated with the user equipment.

Activating secondary cell(s) that actually provide adequate coverage for a user equipment and/or that actually have sufficient network resources relative to network resource demands or needs of the user equipment, as described herein, avoids any unneeded activation of secondary cell(s) that have limited coverage and/or insufficient network resources. This reduces or eliminates signal overhead and transmission delays, which improves overall network system performance and efficiency.

One or more aspects of the subject disclosure include a device, comprising a processing system including a processor, and a memory that stores executable instructions that, when executed by the processing system, facilitate performance of operations. The operations can include obtaining data relating to a user equipment, where the user equipment is communicatively coupled to a first network node of a plurality of network nodes of a network, and where the data relating to the user equipment includes information regarding a data buffer associated with the user equipment. Further, the operations can include obtaining node information relating to a second network node of the plurality of network nodes, where the node information identifies available network resources of the second network node and a coverage range of the second network node. Further the operations can include determining, based on the information regarding the data buffer, that a status of the data buffer satisfies a condition, determining that the first network node has insufficient network resources to satisfy a network resource demand of the user equipment based on the determining that the status of the data buffer satisfies the condition, and selectively activating the second network node, based on the available network resources of the second network node and the coverage range of the second network node, responsive to the determining that the first network node has insufficient network resources to satisfy the network resource demand of the user equipment.

One or more aspects of the subject disclosure include a machine-readable storage device, comprising executable instructions that, when executed by a processing system including a processor, facilitate performance of operations. The operations can include receiving data relating to a user equipment, where the user equipment is communicatively coupled to a first network node of a plurality of network nodes of a network, and where the data relating to the user equipment includes a signal strength measurement associated with a second network node of the plurality of network nodes and information regarding a data buffer associated with the user equipment. Further, the operations can include receiving node information relating to the second network node, where the node information identifies available network resources of the second network node. Further, the operations can include determining, based on the information regarding the data buffer, that a status of the data buffer satisfies a condition, determining that the first network node has insufficient network resources to satisfy a network resource demand of the user equipment based on the determining that the status of the data buffer satisfies the condition, and selectively activating the second network node, based on the signal strength measurement associated with the second network node and the available network resources of the second network node, responsive to the determining that the first network node has insufficient network resources to satisfy the network resource demand of the user equipment.

One or more aspects of the subject disclosure include a method. The method can comprise obtaining, by a processing system including a processor, data relating to a user equipment, where the user equipment is communicatively coupled to a first network node of a plurality of network nodes of a network, and where the data relating to the user equipment includes a signal strength measurement associated with a second network node of the plurality of network nodes, information identifying a projected movement of the user equipment, and information regarding a data buffer associated with the user equipment. Further, the method can include obtaining, by the processing system, node information relating to the second network node, where the node information identifies available network resources of the second network node and a coverage range of the second network node. Further, the method can include determining, by the processing system, and based on the information regarding the data buffer, that a status of the data buffer satisfies a condition, and determining, by the processing system, that the first network node has insufficient network resources to satisfy a network resource need of the user equipment based on the determining that the status of the data buffer satisfies the condition. Further, the method can include selectively activating, by the processing system, the second network node responsive to the determining that the first network node has insufficient network resources to satisfy the network resource need of the user equipment, where the selectively activating the second network node is based on the signal strength measurement associated with the second network node, the information identifying the projected movement of the user equipment, the available network resources of the second network node, and the coverage range of the second network node.

Referring now to FIG. 1A, a block diagram is shown illustrating an example, non-limiting embodiment of a communication network or system 100 in accordance with various aspects described herein. For example, the communication system 100 can facilitate in whole or in part dynamic control, for a user equipment, of activation and/or deactivation of one or more secondary cells (e.g., secondary network nodes of an NR cell and/or Scells, such as LTE-CA Scells) of a network operable in a dual connectivity mode (e.g., EN-DC) based on network resource needs of the user equipment and available network resources (e.g., available bandwidth or the like) of the one or more secondary cells.

The communications network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
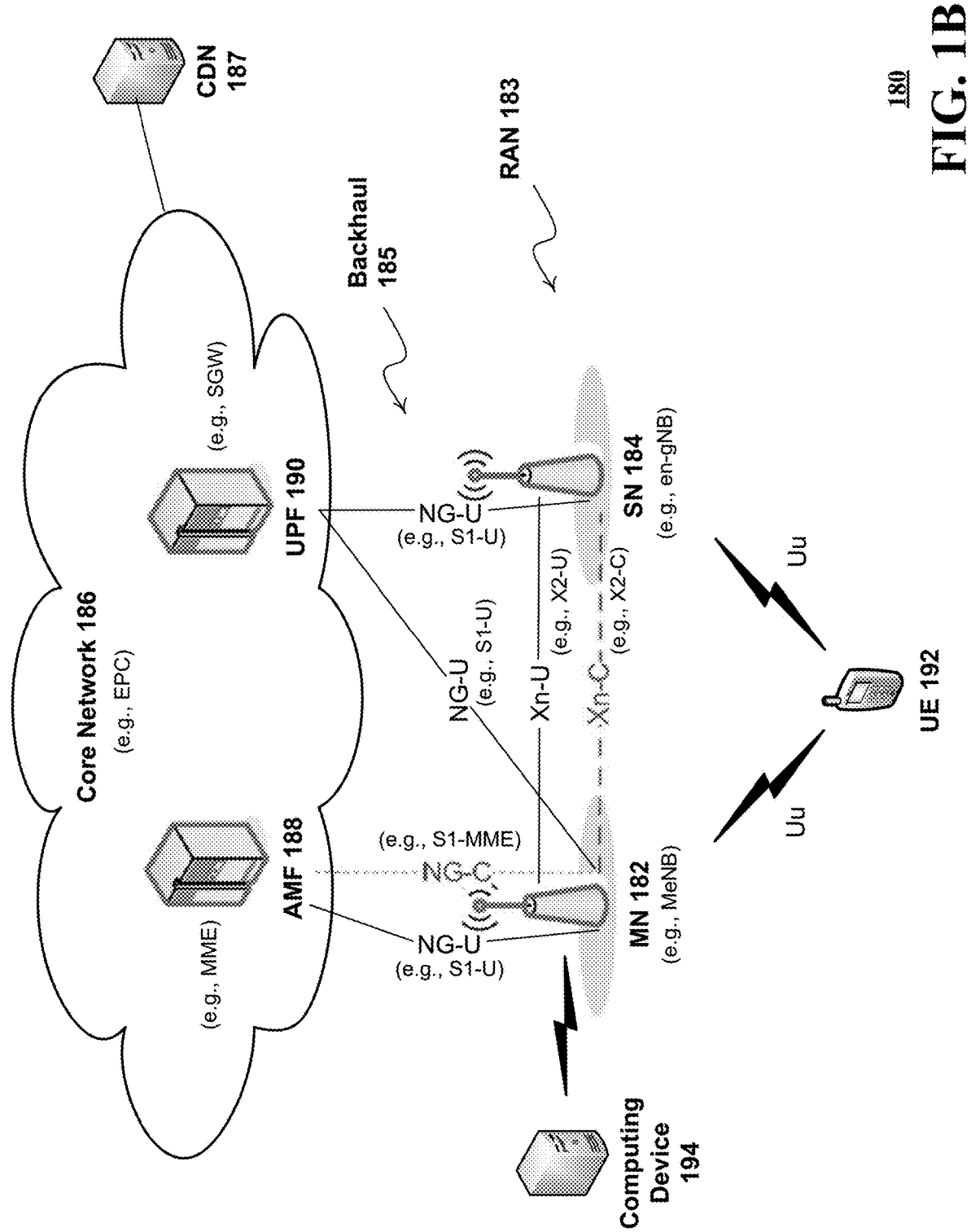
FIG. 1B is a block diagram illustrating an example non-limiting embodiment of a communication network or system functioning within or in conjunction with the communication network of FIG. 1A in accordance with various aspects described herein.

Referring now to FIG. 1B, a block diagram is shown illustrating an example non-limiting embodiment of a communication network (or system) 180 functioning within or in conjunction with the system 100 of FIG. 1A in accordance with various aspects described herein. Communication network 180 can be configured to provide Multi-Radio Dual Connectivity (MR-DC) via a radio access network (RAN) 183 that includes one or more network nodes (e.g., access points, such as base stations or the like). In one example, RAN 183 can include a master node (MN) 182 and a secondary node (SN) 184. In one example, each of MN 182 and SN 184 can employ a different radio access technology (RAT). A user equipment (UE) 192 can be equipped with multiple transmitter (Tx) devices and/or multiple receiver (Rx) devices configured to communicate with, and utilize network resources provided via, the MN 182 and the SN 184. The MN 182 and/or the SN 184 can be operated with shared spectrum channel access.

One or more of the nodes 182, 184 of the RAN 183 can be in communication with a mobility core network 186 via a backhaul network 185. The core network 186 can be in further communication with one or more other networks (e.g., one or more content delivery networks (one of which, CDN 187 is shown)), one or more services and/or one or more devices. The core network 186 can include various network devices and/or systems that provide a variety of functions, such as mobility management, session management, data management, user plane and/or control plane function(s), policy control function(s), and/or the like. As shown in FIG. 1B, the core network 186 can include an Access Mobility and Management Function (AMF) 188 configured to facilitate mobility management in a control plane of the communication network 180, and a User Plane Function (UPF) 190 configured to provide access to a data network, such as a packet data network (PDN), in a user (or data) plane of the communication network 180. The AMF 188 and the UPF 190 can each be implemented in one or more computing devices (e.g., one or more server devices or the like). In some embodiments, the core network 186 can additionally, or alternatively, include one or more devices implementing other functions, such as a master user database server device for network access management, a PDN gateway server device for facilitating access to a PDN, a Unified Data Management (UDM) function, a Session Management Function (SMF), a Policy Control Function (PCF), and/or the like.

The MN 182 and the SN 184 can be communicatively coupled to one another via an Xn-C interface configured to facilitate control plane traffic between the MN 182 and the SN 184, and can also be communicatively coupled to one another via an Xn-U interface configured to facilitate user plane traffic between the MN 182 and the SN 184.

The AMF 188 can be communicatively coupled to the MN 182 via an NG-C interface in the control plane. In some embodiments, the AMF 188 can additionally, or alternatively, be communicatively coupled to the SN 184 via a similar interface in the control plane. The UPF 190 can be communicatively coupled to the MN 182 via an NG-U interface in the user plane, and can be communicatively coupled to the SN 184 via a similar NG-U interface in the user plane.

Each of the MN 182 and the SN 184 can include a radio resource control (RRC) entity capable of exchanging network traffic (e.g., protocol data units (PDUs)) with the UE 192. In some embodiments, the UE 192 can communicate with the MN 182 via a Uu radio interface in an RRC protocol layer of the control plane. In some embodiments, the UE 192 can have a single RRC state, such as a single control plane connection with the core network 186 based on the RRC entity of the MN 182. In some embodiments, the MN 182 can facilitate control plane communications between the SN 184 and the UE 192 by, for example, transporting RRC PDUs, originating from the SN 184, to the UE 192.

The communication network 180 can provide multiple bearer types in the data plane. For example, the bearer types can include a Master Cell Group (MCG) bearer type, a Secondary Cell Group (SCG) bearer type, and a split bearer type. Depending on the RATs employed by the MN 182 and the SN 184, various packet data convergence protocol (PDCP) configurations can be implemented for the different bearer types. Thus, in various embodiments, each bearer type (e.g., the MCG bearer type, the SCG bearer type, and the split bearer type) can be terminated either in the MN 182 or in the SN 184.

In some embodiments, the communication network 180 can be configured to provide dual connectivity according to an E-UTRAN New Radio (NR) Dual Connectivity (EN-DC) configuration. In some embodiments, the EN-DC configuration can provide a 5G Non-Standalone (NSA) implementation. In one example (related to a 5G NSA implementation), an LTE radio and the core network 186 can be utilized as an anchor for mobility management and coverage for an additional 5G (or NR) carrier. Network traffic can be split in a variety of manners, such as across LTE and NR at an eNodeB, at the core network 186, and/or at an NR cell.

In embodiments in which the communication network 180 is configured to provide the EN-DC configuration, the MN 182 can include a master eNodeB (MeNB) that provides E-UTRAN access, and the SN 184 can include an en-gNodeB (en-gNB) that provides NR access. The core network 186 can be (or can include) an evolved packet core (EPC), where the AMF 188 is implemented as a mobility management entity (MME) and the UPF 190 is implemented as a serving gateway (SGW). The core network 186 can include one or more devices that implement one or more functions, such as a Home Subscriber Server (HSS) for managing user access, a PDN gateway server device for facilitating access to a PDN, and/or the like.

In an EN-DC configuration, the MN (MeNB) 182 and the SN (en-gNB) 184 can be communicatively coupled to one another via an X2-C interface in the control plane, and via an X2-U interface in the user plane. The AMF (MME) 188 can be communicatively coupled to the MN (MeNB) 182 via an S1-MME interface in the control plane. In some embodiments, the AMF (MME) 188 can additionally, or alternatively, be communicatively coupled to the SN (en-gNB) 184 via a similar interface in the control plane. The UPF (SGW)

190 can be communicatively coupled to the MN (MeNB) 182 via an S1-U interface in the user plane, and can also be communicatively coupled to the SN (en-gNB) 184 via a similar S1-U interface in the user plane, to facilitate data transfer for the UE 192.

In the EN-DC configuration, the MeNB can include an E-UTRA version of an RRC entity and the en-gNB can include an NR version of an RRC entity. Additionally, in the EN-DC configuration, an E-UTRA PDCP or an NR PDCP can be configured for MeNB terminated MCG bearer types, and an NR PDCP can be configured for all other bearer types.

In some embodiments of the EN-DC configuration, the AMF (MME) 188 can communicate exclusively with the MN (MeNB) 182, but both the MeNB and the en-gNB can access the core network (e.g., EPC) 186. In various embodiments, data traffic can be split between the LTE and NR RATs 182, 184, but where the MN (MeNB) 182 maintains sole control of the dual connectivity mode of the communication network 180. The UE 192 can access the core network (e.g., EPC) 186 by establishing a connection with the MN (MeNB) 182. If the UE 192 supports EN-DC and is capable of communicating in the NR band (e.g., if the UE 192 includes an LTE communication unit, such as an LTE Rx/Tx radio and protocol stack, and an NR communication unit, such as an NR Rx/Tx radio and protocol stack), the MN (MeNB) 182 can instruct the UE 192 to obtain measurements of, and provide measurement report(s) on, the NR band. In a case where the UE 192 identifies a candidate network node in the NR band, such as the SN (en-gNB) 184, the MN (MeNB) 182 can communicate one or more parameters to the en-gNB (e.g., via the X2-C interface) to enable the en-gNB to establish a connection with the UE 192. Upon establishing such a connection, the MN (MeNB) 182 can then forward a portion of any incoming user data, directed for the UE 192, to the SN (en-gNB) 184 for transmission to the UE 192, thereby enabling the UE 192 to simultaneously communicate over LTE and NR to achieve increased data rates. In some embodiments, the MN (MeNB) 182 can request, or otherwise, instruct, the UPF (SGW) 190 to exchange user data directly with the SN (en-gNB) 184. In such embodiments, the en-gNB can similarly forward a portion of any incoming user data, directed for the UE 192, to the MeNB for transmission to the UE 192.

As shown in FIG. 1B, the communication network 180 can include a computing device 194 communicatively coupled with the MN 182. The computing device 194 can include one or more devices, such as server device(s), configured to provide one or more functions or capabilities, such as dual connectivity control functions, edge computing functions and/or capabilities, provisioning of data and/or services for user equipment (e.g., such as UE 192), data analytics function(s), machine learning and/or artificial intelligence function(s) that provide resource management capabilities (e.g., mobility management, admission control, interference management, etc.), automatic planning functions, configuration functions, optimization functions, diagnostic functions, healing functions, and/or the like. For example, in some implementations, the computing device 194 can include, or be implemented in, a multi-access edge computing (MEC) device or device(s), a RAN Intelligent Controller (MC), a Self-Organizing Network (SON), and/or the like. In some embodiments, such as in a case where the core network 186 includes an EPC, the computing device 194 can include, or be implemented in, an MME, an SGW, and/or the like.

It is to be understood and appreciated that the quantity and arrangement of nodes, devices, and networks shown in FIG. 1B are provided as an example. In practice, there may be additional nodes, devices, and/or networks, fewer nodes, devices, and/or networks, different nodes, devices, and/or networks, or differently arranged nodes, devices, and/or networks than those shown in FIG. 1B. For example, the communication network 180 can include more or fewer MNs 182, SNs 184, AMF device(s) 188, UPF device(s) 190, UE's 192, computing devices 194, core networks 186, etc. Furthermore, two or more nodes or devices shown in FIG. 1B may be implemented within a single node or device, or a single node or device shown in FIG. 1B may be implemented as multiple, distributed nodes or devices. Additionally, or alternatively, a set of nodes or devices (e.g., one or more nodes or devices) of the communication network 180 may perform one or more functions described as being performed by another set of nodes or devices of the communication network 180.

Figure 2A:
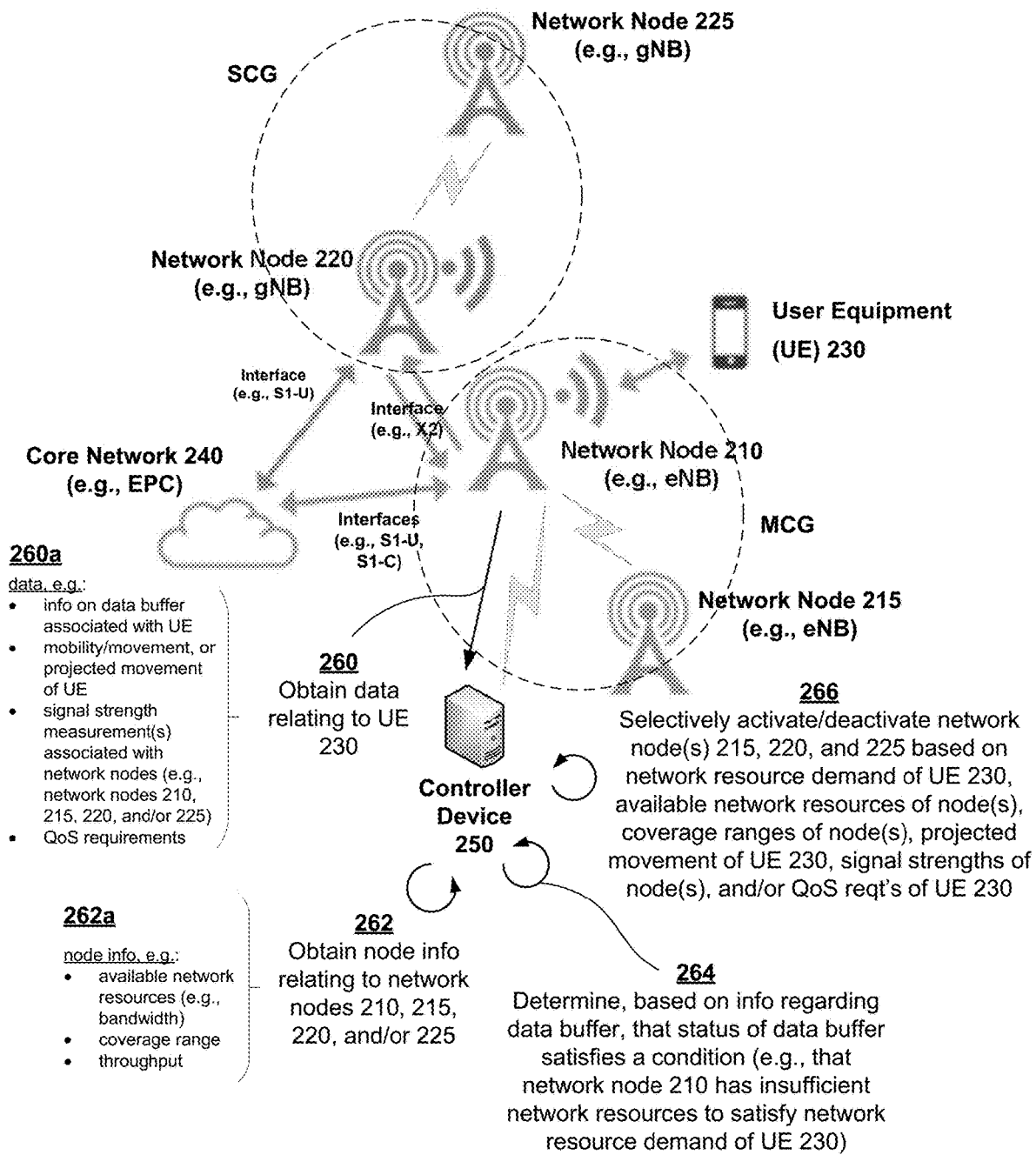
FIG. 2A is a block diagram illustrating an example, non-limiting embodiment of a system functioning within or in conjunction with the communication network of FIG. 1A and/or the communication network of FIG. 1B in accordance with various aspects described herein.

FIG. 2A is a block diagram illustrating an example, non-limiting embodiment of a network system 200 that is operable in a dual connectivity mode (e.g., EN-DC). The network system 200 can provide a radio access network (RAN) that leverages multiple radio access technologies (RATs). The network system 200 can be capable of dynamically, or selectively, controlling, for a user equipment, activation and/or deactivation of one or more secondary cells (e.g., secondary network nodes of an NR cell and/or Scells, such as LTE-CA Scells) of a network operable in a dual connectivity mode (e.g., EN-DC) based on network resource needs of the user equipment, available network resources (e.g., available bandwidth or the like) of the one or more secondary cells, and/or coverage provided by the one or more secondary cells. The network system 200 can function in, or in conjunction with, various communication systems and networks including the communication network 100 of FIG. 1A and/or the communication network 180 of FIG. 1B in accordance with various aspects described herein.

As shown in FIG. 2A, the network system 200 can include network nodes 210 and 215 (e.g., access points, such as base stations or the like) employing a first radio access technology, and network nodes 220 and 225 employing a second radio access technology. In various embodiments, the network node 210 can be a master network node (e.g., an MeNB) included in a primary cell (Pcell), and the network node 215 can be a secondary network node (e.g., an eNB) included in an Scell, where both of the network nodes 210 and 215 may be included as part of a Master Cell Group (MCG) of the RAN. In various embodiments, the network node 220 can be included in a primary cell (e.g., an NR primary cell or Pcell) and the network node 225 can be included in a secondary cell (e.g., an NR secondary cell or Scell), where both of the network nodes 220 and 225 may be included as part of a Secondary Cell Group (SCG) of the RAN. In various embodiments, the network system 200 can include various quantities of cells (e.g., Pcells and/or Scells), various quantities of network nodes in a cell, and/or various types of network nodes and/or cells.

As shown in FIG. 2A, the network system 200 can include a user equipment 230. The user equipment 230 can include, for example, one or more data terminals 114, one or more mobile devices 124, one or more vehicles 126, one or more display devices 144, or one or more other client devices. The network system 200 can also include a core network 240. In various embodiments, the core network 240 can include an evolved packet core (EPC) or the like.

As shown in FIG. 2A, the network system 200 can include a controller device 250 that is communicatively coupled to the network node 210. In various embodiments, the controller device 250 can include, or otherwise correspond to, the computing device 194 of the communication network 180 described above. In various embodiments, the controller device 250 can be implemented in a centralized network hub or node device at, or proximate to, an edge of a network provider's (e.g., a cellular network provider's) overall network. In some embodiments, the controller device 250 can be implemented in a multi-access edge computing (MEC) device or devices. As the name/nomenclature implies, a MEC device may reside at a location that is at, or proximate, to an edge of the network system 200, which may be useful in reducing (e.g., minimizing) delays associated with provisioning of data or services to one or more (requesting) devices. In some embodiments, the controller device 250 can additionally, or alternatively, be implemented in a Self-Organizing Network (SON) or other similar network that provides automatic planning functions, configuration functions, optimization functions, diagnostic functions, and/or healing functions for a network. In some embodiments, the controller device 250 can additionally, or alternatively, be implemented in a RAN Intelligent Controller (RIC) or other similar device or device(s) that leverages data analytics and machine learning and/or artificial intelligence to provide resource management capabilities, such as mobility management, admission control, and interference management, at an edge of a network. In various embodiments, the controller device 250 may be implemented in one or more devices included in the core network 240. For example, in a case where the core network 240 includes an EPC, the controller device 250 can include, or be implemented, in a mobility management entity (MIME) gateway, a serving gateway (SGW), and/or the like.

As shown in FIG. 2A, and as shown by reference number 260, the controller device 250 can obtain data relating to the user equipment 230. In some embodiments, the controller device 250 can obtain the data via the network node 210. As shown by reference number 260a, the data can include information regarding a data buffer associated with the user equipment 230, information identifying movement, or projected movement, of the user equipment 230, signal strength measurement(s) associated with neighboring or nearby network nodes (such as the network nodes 210, 215, 220, and/or 225), QoS requirements associated with the user equipment 230, and/or the like.

In various embodiments, the data buffer can be located in, or otherwise accessible to, the network node 210 and/or one or more server devices included in the core network 240. For example, the data buffer can include a Layer 2 (L2) data buffer configured to temporarily store data packets to and/or from the user equipment 230.

In some embodiments, the information identifying movement, or projected movement, of the user equipment 230 can include information identifying, or otherwise permitting inference of, a current location of the user equipment 230, a direction of movement of the user equipment 230, a speed of travel of the user equipment 230, a trajectory of the user equipment 230, and/or the like. In some embodiments, the controller device 250 can be configured to perform a trajectory analysis of the user equipment 230 to predict a future location of the user equipment 230 based on the current location, speed of travel, direction of travel, and/or the like of the user equipment 230, based on historical location information relating to the user equipment 230 and/or other user equipment, based on behavior information relating to the user equipment 230 and/or other user equipment, and so on.

In various embodiments, the data relating to the user equipment 230 can include measurement reports, including the signal strength measurement(s), provided by the user equipment 230. For example, the network node 210 can exchange measurement information with the user equipment 230 (e.g., B1 measurements, such as LTE and/or inter-radio access technology (RAT) measurements). The user equipment 230 can, based on the exchange(s), identify neighboring cells (e.g., LTE-CA Scells and/or NR Pcell(s) or NR Scell(s)), that provide sufficient signal strength, and transmit measurement report(s) (e.g., B1 measurement report(s), including physical cell identifiers (PCIs), signal strength or power levels, and/or the like) to the network node 210 regarding the identified neighboring cells. In some embodiments, the controller device 250 can command the user equipment 230 to periodically provide measurement reports concerning nearby cells. In this way, the controller device 250 can identify candidate, or potentially eligible, cells that can be activated so as to provide dual connectivity for the user equipment 230.

In various embodiments, the data relating to the user equipment 230 can include one or more QoS class identifiers (QCIs) with associated priority values for various service types (e.g., services related to voice, video, etc.) and/or the like.

In various embodiments, the data relating to the user equipment 230 can include information identifying capabilities of the user equipment 230. In some embodiments, the information can identify whether the user equipment 230 is equipped with RAT components (e.g., receivers, transmitters, transceivers, etc.) that support dual connectivity (e.g., information regarding support for LTE-CA and NR band combinations). In various embodiments, the data relating to the user equipment 230 can include information regarding an identity of the user equipment, physical layer properties of the user equipment, signal round trip times (RTT), and/or the like. In some embodiments, the information can be indicative of a distance between the user equipment 230 and an access point, such as one of the network nodes 210, 215, 220, and 225. As an example, the information can include timing advance data, which may indicate a time or duration of travel of communications, between the user equipment 230 and the access point, that can be used to determine a distance between the user equipment 230 and the access point.

As shown by reference number 262, the controller device 250 can obtain node information relating to the network nodes 210, 215, 220, and/or 225. As shown by reference number 262a, the node information can include information identifying available network resources (e.g., available bandwidth or the like) of some or all (e.g., each) of the network nodes 210, 215, 220, and/or 225 (or corresponding cells), information identifying a coverage range (and/or an estimated coverage range) of some or all (e.g., each) of the network nodes 210, 215, 220, and/or 225, and/or information identifying a throughput of some or all (e.g., each) of the network nodes 210, 215, 220, and/or 225 (which can, for example, also be used to determine available bandwidth). In various embodiments, information identifying the coverage range of a network node can include map data that specifies a network coverage range (e.g., in distance) for that network node.

In some embodiments, the controller device 250 can process the node information to classify, or otherwise aggregate properties for, some or all (e.g., each) of the network nodes 210, 215, 220, and/or 225. For example, the controller device 250 can identify, based on the node information relating to the network node 215 (e.g., corresponding to an LTE-Scell-F3), that the network node 215 has about 3.5 megahertz (MHz) of available bandwidth, an estimated throughput of about 2.5 mega-bits per second (Mbps), and an estimated coverage range of about 3 kilometers (KM). As another example, the controller device 250 can identify, based on the node information relating to the network node 220 (e.g., corresponding to an NR—F1 cell), that the network node 220 has about 10 MHz of available bandwidth, an estimated throughput of about 10 Mbps, and an estimated coverage range of about 0.2 KM. As yet another example, the controller device 250 can identify, based on the node information relating to the network node 225 (e.g., corresponding to an NR—F2 cell), that the network node 225 has about 5 MHz of available bandwidth, an estimated throughput of about 3 Mbps, and an estimated coverage range of about 0.6 KM.

As shown by reference number 264, the controller device 250 can determine, based on the information regarding the data buffer associated with the user equipment 230, that a status of the data buffer satisfies a condition, which may, for example, indicate, or otherwise suggest, that the network node 210 has insufficient network resources to satisfy a network resource demand of the user equipment 230. In various embodiments, the controller device 250 can monitor an available capacity of the data buffer, data volume into and/or out of the data buffer, and/or data overflow at, or data loss by, the data buffer, and determine whether certain condition(s) are satisfied. For example, the controller device 250 can determine whether the data buffer is full or near full (e.g., whether a quantity of data packets queued in the data buffer satisfies a threshold), whether data volume into and/or out of the data buffer is high (e.g., whether a quantity of data packets flowing through the data buffer satisfies a threshold), whether packet loss at the data buffer is high (e.g., whether a quantity of packets being lost at the data buffer satisfies a threshold), and/or the like.

In some embodiments, the controller device 250 can determine whether the network node 210 has sufficient resources to satisfy network resource demand(s) of the user equipment 230 based on the status of the data buffer and/or information identifying available bandwidth of the network node 210. For example, in a case where the controller device 250 determines that an available capacity of the data buffer satisfies a threshold (e.g., is less than or equal to the threshold, or is otherwise low, and thus the data buffer is full or near full) and/or that an available bandwidth of the network node 210 satisfies a related threshold (e.g., is less than or equal to that threshold, or is otherwise low), the controller device 250 can determine that the network node 210 has insufficient network resources to satisfy network resource demand(s) of the user equipment 230. In some embodiments, in a case where the network node 210 has insufficient network resources to satisfy network resource demand(s) of the user equipment 230, the controller device 250 can determine an estimated amount of bandwidth needed to satisfy such demand(s). In some embodiments, the controller device 250 can determine the estimated amount of bandwidth needed based on throughput estimation, such as based on a size of the data buffer (e.g., L2 buffer size), an incoming packet rate relating to the data buffer (e.g., L2 buffer packet rate), and/or a packet drop rate relating to the data buffer (e.g., L2 buffer packet drop rate).

As shown by reference number 266, the controller device 250 can selectively activate and/or deactivate one or more of the network nodes 215, 220, and 225 based on various factors, such as network resource needs of the user equipment 230 (e.g., as determined based on monitoring of the data buffer), the available network resources of the network nodes, the coverage ranges of the network nodes, projected movement of the user equipment 230, signal strengths of the network nodes relative to the user equipment 230, and/or QoS requirements of the user equipment 230.

In various embodiments, the controller device 250 can identify a network node as a candidate for selective activation based on the above-described measurement report(s) provided by the user equipment 230 (e.g., based on the fact that the network node is included in the measurement report(s)). In various embodiments, the controller device 250 can associate a priority level with each candidate network node based on one or more of the available network resources of all candidate network nodes, the coverage ranges of all candidate network nodes, signal strengths of all candidate network nodes, QoS requirements of the user equipment 230, and/or projected movement of the user equipment 230, and selectively activate one or more of the candidate network nodes based on the priority levels. For example, the controller device 250 can associate a higher priority level with a first network node that has more available network resources, has a larger coverage range, and/or provides a higher signal strength to the user equipment 230 than with a second network node that has less available network resources, has a smaller coverage range, and/or provides a lower signal strength to the user equipment 230, and can selectively activate the first network node, and not the second network node, based on the respective priority levels. As another example, the controller device 250 can associate a higher priority level with a first network node that can fully satisfy the QoS requirements of the user equipment 230 than with a second network node that cannot, or can only partially, satisfy the QoS requirements, and can selectively activate the first network node, and not the second network node, based on the respective priority levels.

In various embodiments, the controller device 250 can selectively activate a network node based on one or more of the above-mentioned factors satisfying a threshold and/or a condition. For example, the controller device 250 can selectively activate a network node based on the available network resources of the network node satisfying a threshold relating to the network resource needs of the user equipment 230 (e.g., is greater than or equal to the network resource needs of the user equipment 230). As another example, the controller device 250 can selectively activate a network node based on a probability of the user equipment 230 remaining within a coverage area of the network node (e.g., according to movement, or projected movement, of the user equipment 230 identified in, or inferred, from the above-described data relating to the user equipment 230) satisfying a threshold (e.g., is greater than or equal to that threshold). It is to be understood and appreciated that the controller device 250 can selectively activate a network node based on any of these factors, such as only one of these factors or a combination of two or more of these factors.

As an example, and with reference to the scenarios described above with respect to reference number 262 for the network node 215 (e.g., LTE-Scell-F3), the network node 220 (e.g., NR—F1 cell), and the network node 225 (e.g., NR—F2 cell), in a case where the controller device 250 determines that the user equipment 230's data usage rate is about 2 Mbps (e.g., based on monitoring of the data buffer), and determines that the probabilities of the user equipment 230 remaining within coverage ranges of the network nodes 220 and 225 are low (e.g., based on determining that the network nodes 220 and 225 have small coverage ranges relative to a projected movement or trajectory of the user equipment 230) and that the probability of the user equipment 230 remaining within the coverage range of the network node 215 is high (e.g., based on determining that the network node 215 has a large coverage range relative to a projected movement or trajectory of the user equipment 230), the controller device 250 can selectively activate the network node 215 (e.g., LTE-Scell-F3) for the user equipment 230, and not the network node 220 (e.g., NR—F1) or the network node 225 (e.g., NR—F2).

As another example, in a case where the controller device 250 determines that the user equipment 230's data usage rate is about 8 Mbps, determines that QoS requirements associated with the user equipment 230 satisfy a threshold (e.g., are high based on a priority value, service type, and/or the like), and determines that the probability of the user equipment 230 remaining within the coverage range of the network node 220 is high (e.g., based on projecting minimal movement of the user equipment 230), the controller device 250 can selectively activate the network node 220 (e.g., NR—F1) for the user equipment 230, and not the network node 215 (e.g., LTE-Scell-F3) or the network node 225 (e.g., NR—F2).

As yet another example, in a case where the controller device 250 determines that the user equipment 230's data usage rate is about 8 Mbps, determines that QoS requirements associated with the user equipment 230 satisfy a threshold (e.g., are low based on a priority value, service type, and/or the like), and determines that the probability of the user equipment 230 remaining within a coverage range of the network node 215 is high (e.g., based on determining that the network node 215 has a large coverage range relative to a projected movement or trajectory of the user equipment 230), the controller device 250 can selectively activate the network node 215 (e.g., LTE-Scell-F3) for the user equipment 230, and not the network node 220 (e.g., NR—F1) or the network node 225 (e.g., NR—F2).

In various embodiments, the controller device 250 can periodically obtain updated data relating to the user equipment 230 and/or updated node information, and based on the updated data and/or updated node information, repeat some or all of the actions described above with respect to reference numbers 264 and/or 266. For example, in some cases, the network resource demands of the user equipment 230 can change (e.g., as determined by monitoring of the data buffer associated with the user equipment 230), a projected movement or trajectory of the user equipment 230 can change, and/or available network resources at a network node (e.g., the network nodes 210, 215, 220, and/or 225) can change. In such cases, the controller device 250 can dynamically, or selectively, activate and/or deactivate one or more of the network nodes to ensure that the user equipment 230 communicatively couples with one or more network nodes that can provide appropriate network coverage for the user equipment 230 and sufficient network resources that meet the network resource needs of the user equipment 230.

It is to be understood and appreciated that the above-described manners in which the controller device 250 can dynamically, or selectively, activate or deactivate a network node (or cell) for the user equipment 230 are merely examples, and that the controller device 250 can additionally, or alternatively, dynamically, or selectively, activate and/or deactivate a network node (or cell) for the user equipment 230 in one or more other ways or based on one or more other factors or criteria.

For example, in some embodiments, the controller device 250 can selectively activate and/or deactivate a network node for the user equipment 230 based on a comparison of a priority value associated with the user equipment 230 and priority values associated with one or more other user equipment. Continuing with the example, where a user equipment is associated with a higher priority (e.g., for being enrolled in a particular subscription plan), that user equipment may be permitted to connect to the network system 200 via a secondary network node associated with the NR—F1 cell or the NR—F2 cell, whereas for another user equipment associated with a lower priority (e.g., for being enrolled in a different subscription plan), that user equipment may be permitted to connect to the network system 200 via only a secondary network node associated with LTE-Scell-F1, and not a secondary network node associated with the NR—F1 cell or the NR—F2 cell.

As another example, the controller device 250 can selectively activate and/or deactivate a network node for the user equipment 230 based on an increase in available bandwidth in one or more of the network nodes 210, 215, 220, and 225. As yet another example, the controller device 250 can selectively activate and/or deactivate a network node for the user equipment 230 based on historical network traffic patterns of the network nodes 210, 215, 220, and/or 225 and/or of the overall network system 200 (e.g., traffic patterns at, or during, certain times of day, on a certain day of a week, on a certain day of a month, on a certain day of a year, and/or the like).

It is also to be understood and appreciated that the quantity and arrangement of devices and networks shown in FIG. 2A are provided as an example. In practice, there may be additional nodes, devices, and/or networks, fewer nodes, devices, and/or networks, different nodes, devices, and/or networks, or differently arranged nodes, devices, and/or networks than those shown in FIG. 2A. For example, the network system 200 can include more or fewer network nodes 210, network nodes 215, network nodes 220, network nodes 225, user equipment 230, core networks 240, controller devices 250, etc. Furthermore, two or more nodes or devices shown in FIG. 2A may be implemented within a single node or device, or a single node or device shown in FIG. 2A may be implemented as multiple, distributed nodes or devices. Additionally, or alternatively, a set of nodes or devices (e.g., one or more nodes or devices) of the network system 200 may perform one or more functions described as being performed by another set of nodes or devices of the network system 200.

Figure 2B:
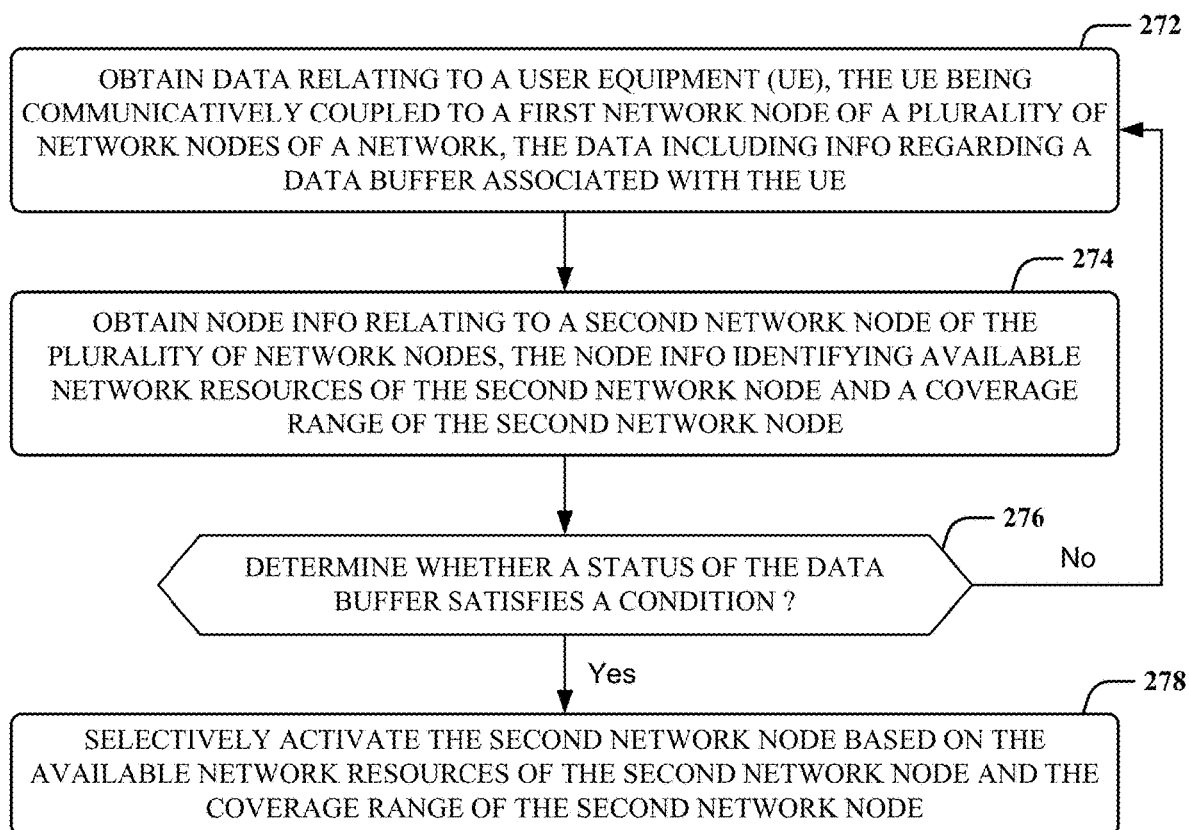
FIG. 2B depicts an illustrative embodiment of a method in accordance with various aspects described herein.

FIG. 2B depicts an illustrative embodiment of a method 270 in accordance with various aspects described herein. In some embodiments, one or more process blocks of FIG. 2B can be performed by a controller device, such as the controller device 250. In some embodiments, one or more process blocks of FIG. 2B may be performed by another device or a group of devices separate from or including the controller device, such as the network node 210, the network node 215, the network node 220, the network node 225, the core network 240, and/or the user equipment 230.

At 272, the method can include obtaining data relating to a user equipment, where the user equipment is communicatively coupled to a first network node of a plurality of network nodes of a network, and where the data includes information regarding a data buffer associated with the user equipment. For example, the controller device 250 can obtain data relating to the user equipment 230 in a manner similar to that described above with respect to the network system 200 of FIG. 2A, where the user equipment 230 is communicatively coupled to the network node 210 of the network system 200, and where the data includes information regarding a data buffer (e.g., an L2 buffer or the like) associated with the user equipment 230. In various embodiments, the data relating to the user equipment 230 can include signal strength measurement(s) associated with neighboring network nodes (e.g., the network nodes 215, 220, and/or 225), information identifying movement, or projected movement, of the user equipment 230, QoS requirements associated with the user equipment 230, or a combination thereof.

At 274, the method can include obtaining node information relating to a second network node of the plurality of network nodes, where the node information identifies available network resources of the second network node and a coverage range of the second network node. As an example, the controller device 250 can obtain node information relating to one of the network nodes 215, 220, and 225 in a manner similar to that described above with respect to the network system 200 of FIG. 2A, where the node information identifies available network resources of the one of the network nodes 215, 220, and 225 and a coverage range of the one of the network nodes 215, 220, and 225. In some embodiments, the node information can identify a throughput of the network node. In various embodiments, the controller device 250 can obtain node information for additional network nodes, such as some or all of the network nodes 215, 220, and 225. In some embodiments, the controller device 250 can determine node metrics for, or otherwise classify, the network nodes based on the node information.

At 276, the method can include determining, based on the information regarding the data buffer, whether a status of the data buffer satisfies a condition. For example, the controller device 250 can determine, based on the information regarding the data buffer, whether a status of the data buffer satisfies a condition in a manner similar to that described above with respect to the network system 200 of FIG. 2A.

If the status of the data buffer does not satisfy the condition, then the method can return to block 272. In some embodiments, the method can alternatively return to block 274 or 276. If the status of the data buffer satisfies the condition, then, at 278, the method can include selectively activating the second network node based on the available network resources of the second network node and the coverage range of the second network node. For example, the controller device 250 can selectively activate the one of the network nodes 215, 220, and 225 based on the available network resources of the one of the network nodes 215, 220, and 225 and the coverage range of the one of the network nodes 215, 220, and 225 in a manner similar to that described above with respect to the network system 200 of FIG. 2A.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, communication network 180, the subsystems and functions of network system 200 and method 270 presented in FIGS. 1A, 1B, 2A, and 2B. For example, virtualized communication network 300 can facilitate in whole or in part dynamic control, for a user equipment, of activation and/or deactivation of one or more secondary cells (e.g., secondary network nodes of an NR cell and/or Scells, such as LTE-CA Scells) of a network operable in a dual connectivity mode (e.g., EN-DC) based on network resource needs of the user equipment and available network resources (e.g., available bandwidth or the like) of the one or more secondary cells.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1A), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP—VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
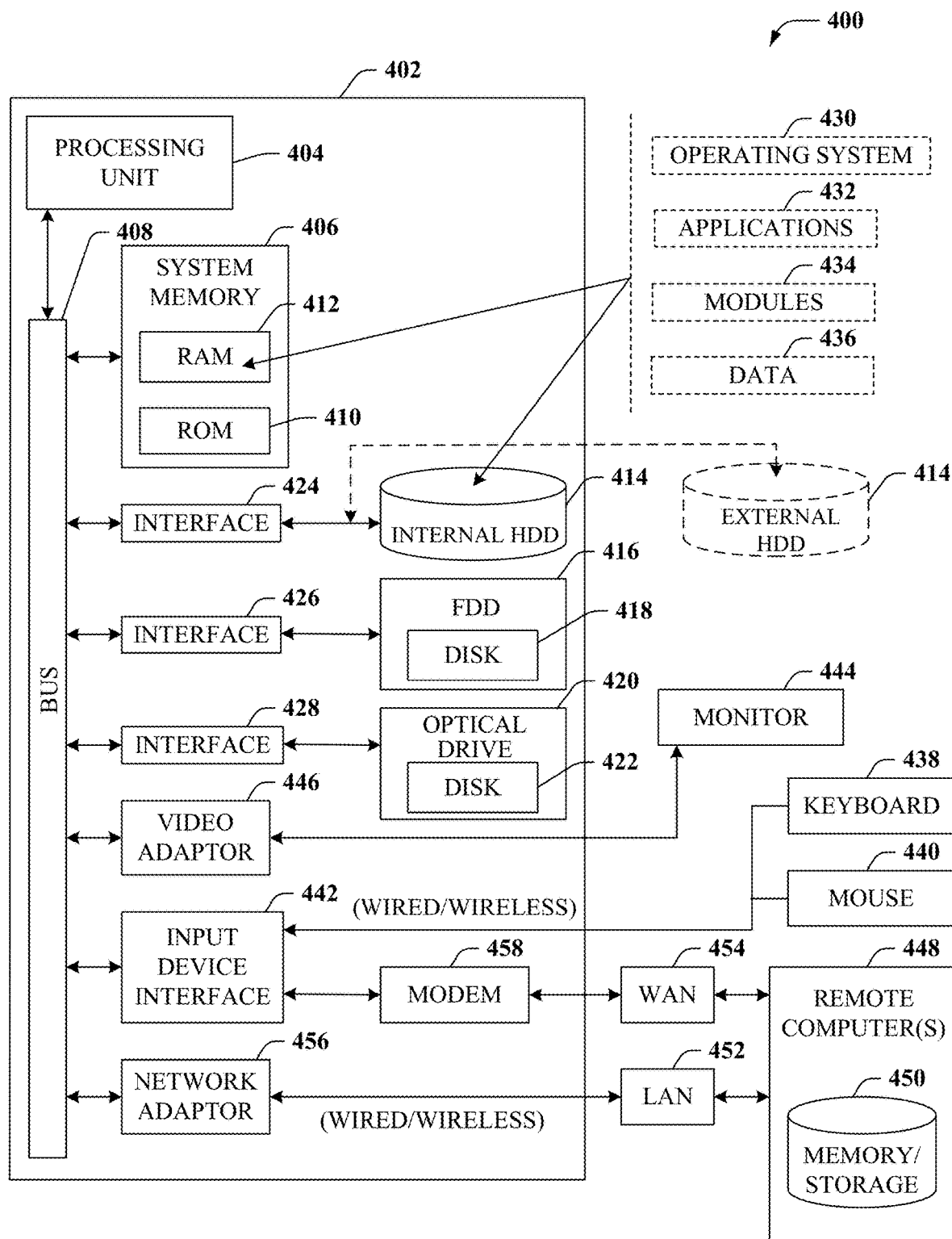
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part dynamic control, for a user equipment, of activation and/or deactivation of one or more secondary cells (e.g., secondary network nodes of an NR cell and/or Scells, such as LTE-CA Scells) of a network operable in a dual connectivity mode (e.g., EN-DC) based on network resource needs of the user equipment and available network resources (e.g., available bandwidth or the like) of the one or more secondary cells.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
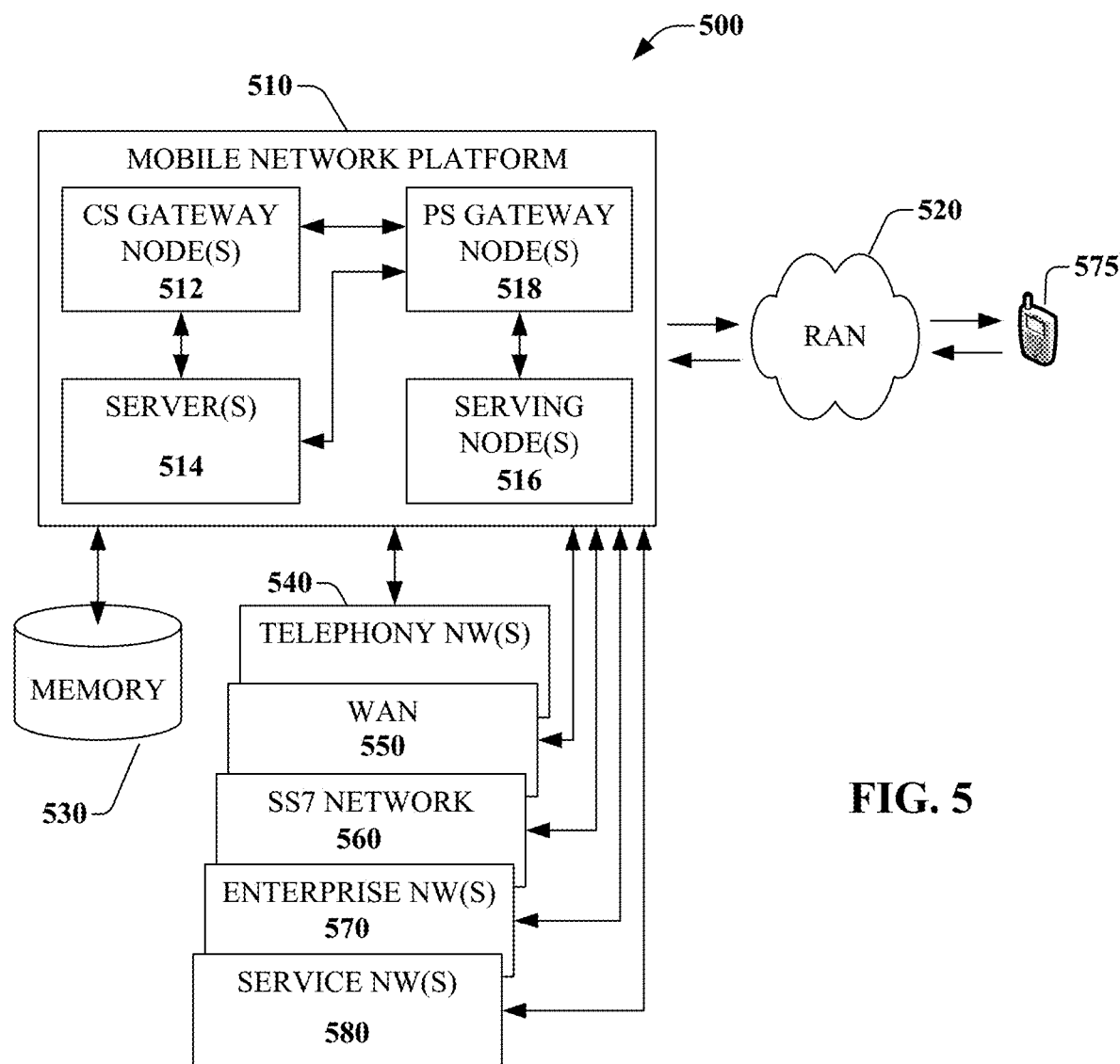
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part dynamic control, for a user equipment, of activation and/or deactivation of one or more secondary cells (e.g., secondary network nodes of an NR cell and/or Scells, such as LTE-CA Scells) of a network operable in a dual connectivity mode (e.g., EN-DC) based on network resource needs of the user equipment and available network resources (e.g., available bandwidth or the like) of the one or more secondary cells.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1A that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
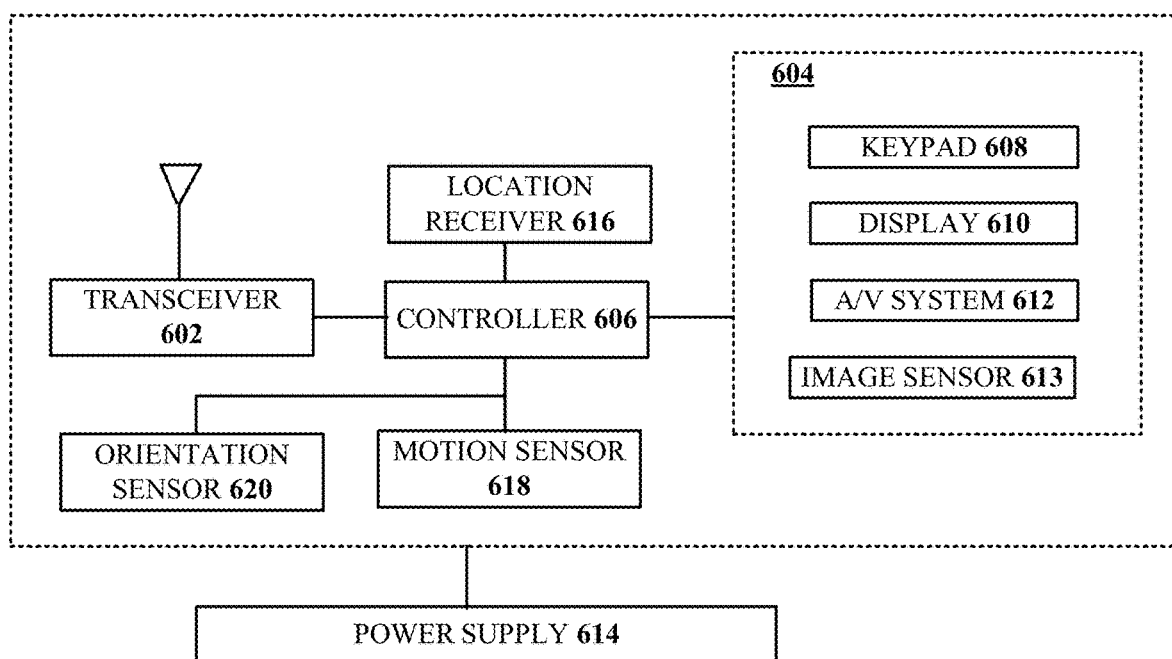
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part dynamic control, for a user equipment, of activation and/or deactivation of one or more secondary cells (e.g., secondary network nodes of an NR cell and/or SCells, such as LTE-CA Scells) of a network operable in a dual connectivity mode (e.g., EN-DC) based on network resource needs of the user equipment and available network resources (e.g., available bandwidth or the like) of the one or more secondary cells.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining data relating to a user equipment, wherein the user equipment is communicatively coupled to a first network node of a plurality of network nodes of a network, and wherein the data relating to the user equipment includes information regarding a data buffer associated with the user equipment;
   determining, based on the information regarding the data buffer, that a status of the data buffer satisfies a condition;
   determining that the first network node has insufficient network resources to satisfy a network resource demand of the user equipment based on the determining that the status of the data buffer satisfies the condition; and
   responsive to the determining that the first network node has insufficient network resources to satisfy the network resource demand of the user equipment, selectively deactivating the first network node for the user equipment, wherein the selectively deactivating is based on node information that identifies available network resources of a second network node and a coverage range of the second network node.

2. The device of claim 1, wherein the data relating to the user equipment further includes information identifying a projected movement of the user equipment, and wherein the selectively deactivating the first network node is further based on the projected movement of the user equipment.

3. The device of claim 1, wherein the data relating to the user equipment further includes quality of service (QoS) requirements associated with the user equipment, and wherein the determining that the first network node has insufficient network resources to satisfy the network resource demand of the user equipment is further based on the QoS requirements.

4. The device of claim 1, wherein the operations further comprise obtaining additional node information, and wherein the additional node information relates to a third network node of the plurality of network nodes and identifies available network resources of the third network node and a coverage range of the third network node.

5. The device of claim 4, wherein the selectively deactivating the first network node is further based on the available network resources of the third network node and the coverage range of the third network node.

6. The device of claim 1, wherein the operations further comprise determining one of a change in the available network resources of the second network node or a change in the coverage range of the second network node.

7. The device of claim 1, wherein the data relating to the user equipment further includes a signal strength measurement associated with the second network node, and wherein the selectively deactivating the first network node is further based on the signal strength measurement.

8. The device of claim 1, wherein the available network resources of the second network node comprises available bandwidth.

9. The device of claim 1, wherein the determining that the status of the data buffer satisfies the condition comprises determining that an available capacity of the data buffer is less than or equal to a threshold.

10. A non-transitory machine-readable storage device, comprising executable instructions that, when executed by a processing system including a processor, facilitate performance of operations comprising:
    receiving data relating to a user equipment, wherein the user equipment is communicatively coupled to a first network node of a plurality of network nodes of a network, and wherein the data relating to the user equipment includes a signal strength measurement associated with a second network node of the plurality of network nodes and information regarding a data buffer associated with the user equipment;

determining, based on the information regarding the data buffer, that a status of the data buffer satisfies a condition;

determining that the first network node has insufficient network resources to satisfy a network resource demand of the user equipment based on the determining that the status of the data buffer satisfies the condition; and responsive to the determining that the first network node has insufficient network resources to satisfy the network resource demand of the user equipment, selectively deactivating the first network node for the user equipment, wherein the selectively deactivating is based on the signal strength measurement associated with the second network node and based on node information that identifies available network resources of the second network node.

11. The non-transitory machine-readable storage device of claim 10, wherein the data buffer is located in the first network node or in a core network.

12. The non-transitory machine-readable storage device of claim 10, wherein the network is operable in a dual connectivity mode.

13. The non-transitory machine-readable storage device of claim 10, wherein the first network node employs a first radio access technology, and wherein the second network node employs a second radio access technology that is different from the first radio access technology.

14. The non-transitory machine-readable storage device of claim 10, wherein the first network node and the second network node employ the same radio access technology.

15. The non-transitory machine-readable storage device of claim 10, wherein the available network resources of the second network node comprises available bandwidth.

16. The non-transitory machine-readable storage device of claim 10, wherein the first network node is a master network node in a Master Cell Group (MCG) of the network, and wherein the second network node is one of a secondary network node in the MCG or a primary network node in a Secondary Cell Group (SCG).

17. A method, comprising:

obtaining, by a processing system including a processor, data relating to a user equipment, wherein the user equipment is communicatively coupled to a first network node of a plurality of network nodes of a network, and wherein the data relating to the user equipment includes a signal strength measurement associated with a second network node of the plurality of network nodes, information identifying a projected movement of the user equipment, and information regarding a data buffer associated with the user equipment;

determining, by the processing system, and based on the information regarding the data buffer, that a status of the data buffer satisfies a condition;

determining, by the processing system, that the first network node has insufficient network resources to satisfy a network resource need of the user equipment based on the determining that the status of the data buffer satisfies the condition; and selectively deactivating, by the processing system, the first network node for the user equipment responsive to the determining that the first network node has insufficient network resources to satisfy the network resource need of the user equipment, wherein the selectively deactivating the first network node is based on the signal strength measurement associated with the second network node, based on the information identifying the projected movement of the user equipment, and based on node information that identifies available network resources of the second network node and a coverage range of the second network node.

18. The method of claim 17, wherein the determining that the status of the data buffer satisfies the condition comprises determining that the data buffer is overflowing.

19. The method of claim 17, wherein the data relating to the user equipment further includes quality of service (QoS) requirements associated with the user equipment, and wherein the determining that the first network node has insufficient network resources to satisfy the network resource need of the user equipment is further based on the QoS requirements.

20. The method of claim 17, wherein the available network resources of the second network node comprises available bandwidth.

* * * * *